United States Patent
McCune et al.

(10) Patent No.: US 8,720,306 B2
(45) Date of Patent: May 13, 2014

(54) TURBINE ENGINE GEARBOX

(75) Inventors: Michael E. McCune, Colchester, CT (US); Ahmet Kahraman, Westerville, OH (US)

(73) Assignees: United Technologies Corporation, Hartford, CT (US); The Ohio State University, Columbus, OH (US)

( * ) Notice: Subject to any disclaimer, the term of this patent is extended or adjusted under 35 U.S.C. 154(b) by 0 days.

(21) Appl. No.: 13/438,245

(22) Filed: Apr. 3, 2012

(65) Prior Publication Data

US 2013/0192264 A1    Aug. 1, 2013

Related U.S. Application Data

(60) Provisional application No. 61/592,964, filed on Jan. 31, 2012.

(51) Int. Cl.
*F16H 37/06*      (2006.01)
*F02C 3/14*      (2006.01)

(52) U.S. Cl.
USPC .................................. 74/665 GD; 60/39.34

(58) Field of Classification Search
USPC ........ 74/665 GD, 665 B, 640; 60/226.1, 792, 60/39.163, 39.162, 268, 677, 793, 774; 475/129, 159
See application file for complete search history.

(56) References Cited

U.S. PATENT DOCUMENTS

| | | | |
|---|---|---|---|
| 2,684,591 A | 7/1954 | Lundquist | |
| 2,734,396 A | 2/1956 | Falk et al. | |
| 2,823,558 A * | 2/1958 | Semar et al. | ................. 74/665 B |
| 3,160,026 A | 12/1964 | Rosen | |
| 3,352,178 A | 11/1967 | Lindgren et al. | |
| 3,969,956 A * | 7/1976 | Hanslik | ..................... 74/665 GD |
| 4,583,413 A | 4/1986 | Lack | |
| 5,211,541 A | 5/1993 | Fledderjohn et al. | |
| 5,415,595 A | 5/1995 | Nelson | |
| 5,433,674 A | 7/1995 | Sheridan et al. | |
| 5,466,198 A | 11/1995 | McKibbin et al. | |
| 5,472,383 A * | 12/1995 | McKibbin | ..................... 475/159 |
| 5,485,761 A * | 1/1996 | Rouverol | ......................... 74/462 |
| 5,528,960 A | 6/1996 | Nagao et al. | |

(Continued)

FOREIGN PATENT DOCUMENTS

| | | |
|---|---|---|
| EP | 0896922 B1 | 1/2004 |
| EP | 1876338 | 1/2008 |

(Continued)

OTHER PUBLICATIONS

Drago, Raymond J., Fundamentals of Gear Design, 1988, pp. 22-23.

(Continued)

*Primary Examiner* — Troy Chambers
*Assistant Examiner* — Jude Agendia
(74) *Attorney, Agent, or Firm* — Carlson, Gaskey & Olds, PC

(57) ABSTRACT

An example method of controlling performance of gearbox of a gas turbine engine includes establishing a gear characteristic of a plurality of double helical gears each disposed about a respective axis in a gearbox. Performance of the plurality of double helical gears is controlled by selecting a circumferential offset distance between a first plurality of gear teeth spaced apart from a second plurality of gear teeth on each of the plurality of double helical gears in response to the established gear characteristic.

13 Claims, 5 Drawing Sheets

(56) References Cited

U.S. PATENT DOCUMENTS

| | | | |
|---|---|---|---|
| 5,815,922 A | 10/1998 | Sato | |
| 5,842,946 A * | 12/1998 | Ichiki | 475/252 |
| 6,223,616 B1 * | 5/2001 | Sheridan | 74/468 |
| 6,264,138 B1 | 7/2001 | Hawkins | |
| 6,302,356 B1 | 10/2001 | Hawkins | |
| 6,402,654 B1 | 6/2002 | Lanzon et al. | |
| 6,622,473 B2 | 9/2003 | Becquerelle et al. | |
| 6,666,102 B2 * | 12/2003 | Gmirya et al. | 74/406 |
| 6,832,973 B1 * | 12/2004 | Welsh | 475/331 |
| 6,886,325 B2 * | 5/2005 | Norris et al. | 60/39.34 |
| 6,986,726 B2 * | 1/2006 | Simon | 475/340 |
| 7,591,754 B2 | 9/2009 | Duong et al. | |
| 7,662,059 B2 | 2/2010 | McCune | |
| 7,694,505 B2 | 4/2010 | Schilling | |
| 7,704,178 B2 | 4/2010 | Sheridan et al. | |
| 7,963,190 B2 * | 6/2011 | Sullivan et al. | 74/640 |
| 8,015,900 B2 * | 9/2011 | Gmirya | 74/665 GA |
| 8,047,505 B2 | 11/2011 | Biester | |
| 8,205,432 B2 * | 6/2012 | Sheridan | 60/226.3 |
| 2005/0192151 A1 * | 9/2005 | Simon | 475/331 |
| 2008/0006018 A1 | 1/2008 | Sheridan et al. | |
| 2008/0044276 A1 | 2/2008 | McCune et al. | |
| 2008/0116009 A1 | 5/2008 | Sheridan et al. | |
| 2009/0062058 A1 * | 3/2009 | Kimes et al. | 475/344 |
| 2009/0090096 A1 * | 4/2009 | Sheridan | 60/226.3 |
| 2009/0227415 A1 | 9/2009 | Buelna | |
| 2009/0277299 A1 * | 11/2009 | Gmirya | 74/665 A |
| 2009/0293278 A1 | 12/2009 | Duong et al. | |
| 2009/0298640 A1 | 12/2009 | Duong et al. | |
| 2011/0092331 A1 | 4/2011 | Haughom | |
| 2011/0124461 A1 * | 5/2011 | Torii et al. | 475/159 |
| 2011/0143880 A1 * | 6/2011 | Minadeo et al. | 475/346 |
| 2012/0071288 A1 * | 3/2012 | Dalenberg et al. | 475/159 |
| 2012/0189430 A1 | 7/2012 | McCune et al. | |

FOREIGN PATENT DOCUMENTS

| | | |
|---|---|---|
| FR | 1357038 | 4/1964 |
| GB | 111329 | 11/1917 |
| JP | 4636927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

Drago, Raymond J., "Helical Gears", Standard Handbook of Machine Design, Chapter 35, pp. 35.1-35.57.

Day, Percy C., "Herringbone Gears", Transactions American Society of Mechanical Engineers, 1912, pp. 681-715.

Townsend, Dennis P., "Gear Types and Nomenclature", Dudley's Gear Handbook, Second Edition, 1991, p. 2.7.

Gunston, Bill, "Jane's Aero-Engines," Issue Seven, 2000, pp. 510-512.

Helical Gears, Double Helical Gears; From DixiTech CNC, http://www.dixitechcnc.com/helical_gear.html.

American Petroleum Institute. Special Purpose Gear Units for Petroleum, Chemical, and Gas Industry Services. API Standard 613 Fourth Edition. Jun. 1995. pp. 1-73.

International Search Report and Written Opinion for International Application No. PCT/US2013/023356 completed on Oct. 22, 2013.

Japanese Office Action for Japanese Application No. 2007-202444, Aug. 3, 2010.

European Search Report for EP Application No. 07253078.5, Dec. 5, 2007.

* cited by examiner

TURBINE ENGINE GEARBOX

CROSS REFERENCE TO RELATED APPLICATIONS

This application claims priority to U.S. Provisional Application No. 61/592,964 which was filed on Jan. 31, 2012.

BACKGROUND

This disclosure relates generally to a turbine engine, and more specifically to a gearbox for a gas turbine engine.

A turbine engines includes a fan driven by a turbine. A gearbox is coupled between the fan to the turbine. The gearbox provides a speed decrease between the turbine and the fan.

SUMMARY

In one non-limiting disclosed embodiment, a method of controlling performance of gearbox of a gas turbine engine includes establishing a gear characteristic of a plurality of double helical gears each disposed about a respective axis in a gearbox. Performance of the plurality of double helical gears is controlled by selecting a circumferential offset distance between a first plurality of gear teeth spaced apart from a second plurality of gear teeth on each of the plurality of double helical gears in response to the established gear characteristic.

In a further embodiment of any of the above examples, the gear characteristic is a harmonic level.

In a further embodiment of any of the above examples, the harmonic level is one of the first harmonic level, a second harmonic level, and a third harmonic level.

In a further embodiment of any of the above examples, the first plurality of gear teeth are offset from the second plurality of gear teeth by the circumferential offset distance of about 25% to 75% of a circumferential offset distance between each of the second plurality of teeth. The harmonic level is the first harmonic level.

In a further embodiment of any of the above examples, the first plurality of gear teeth are offset from the second plurality of gear teeth by the circumferential offset distance of about 15% to 25% or 75% to 85% of a circumferential offset distance between each of the second plurality of teeth. The harmonic level is the second harmonic level.

In a further embodiment of any of the above examples, the first plurality of gear teeth are offset from the second plurality of gear teeth by the circumferential offset distance of about 50% of a circumferential offset distance between each of the second plurality of teeth. The harmonic level is at least one of the first harmonic level or the third harmonic level.

In a further embodiment of any of the above examples, further including the steps of determining an angle relative to the axis of each double helical gear and disposing the first plurality of gear teeth and the second plurality of gear teeth of each of the plurality of double helical gears at the angle relative to respective axes of each double helical gear.

In a further embodiment of any of the above examples, the step of determining the angle is at least partially determined by a contact ratio.

In one non-limiting disclosed embodiment, a turbine engine includes a fan, a compressor section, a combustor in fluid communication with the compressor section, a turbine section in fluid communication with the combustor, and a gearbox coupled with the fan and the turbine section. The gearbox includes a plurality of double helical gears in meshed engagement, each having a first plurality of gear teeth spaced apart from a second plurality of gear teeth. The first plurality of gear teeth are circumferentially offset from the second plurality of gear teeth by a predetermined amount in response to a harmonic level.

In a further embodiment of any of the above examples, the gearbox includes an epicyclic gear system.

In a further embodiment of any of the above examples, the plurality of double helical gears are a sun gear, plurality of star gears, and ring gear of the epicyclic gear system.

In a further embodiment of any of the above examples, the first plurality of gear teeth and the second plurality of gear teeth about each double helical gear are disposed at a helix angle relative to an axis.

In a further embodiment of any of the above examples, the helix angle is between about 30-35°.

In a further embodiment of any of the above examples, the helix angle is about 33°.

In one non-limiting disclosed embodiment, a gearbox for a gas turbine engine includes a plurality of double helical gears in meshed engagement. Each of the plurality of double helical gears is disposed about an axis. Each of the plurality of double helical gears has a first plurality of gear teeth spaced apart from a second plurality of gear teeth. The first plurality of gear teeth are circumferentially offset from the second plurality of gear teeth by a predetermined amount in response to a gear characteristic.

In a further embodiment of any of the above examples, the gear characteristic is a harmonic level.

In a further embodiment of any of the above examples, the harmonic level is one of the first harmonic level, a second harmonic level, and a third harmonic level.

In a further embodiment of any of the above examples, the first plurality of gear teeth are offset from the second plurality of gear teeth by the circumferential offset distance of about 25% to 75% of a circumferential offset distance between each of the second plurality of teeth.

In a further embodiment of any of the above examples, a helix angle between the axis and each of the first plurality of gear teeth and second plurality of gear teeth is between 30° and 35°.

In a further embodiment of any of the above examples, a helix angle between the axis and each of the first plurality of gear teeth and second plurality of gear teeth is 33°.

DETAILED DESCRIPTION

Figure 1:
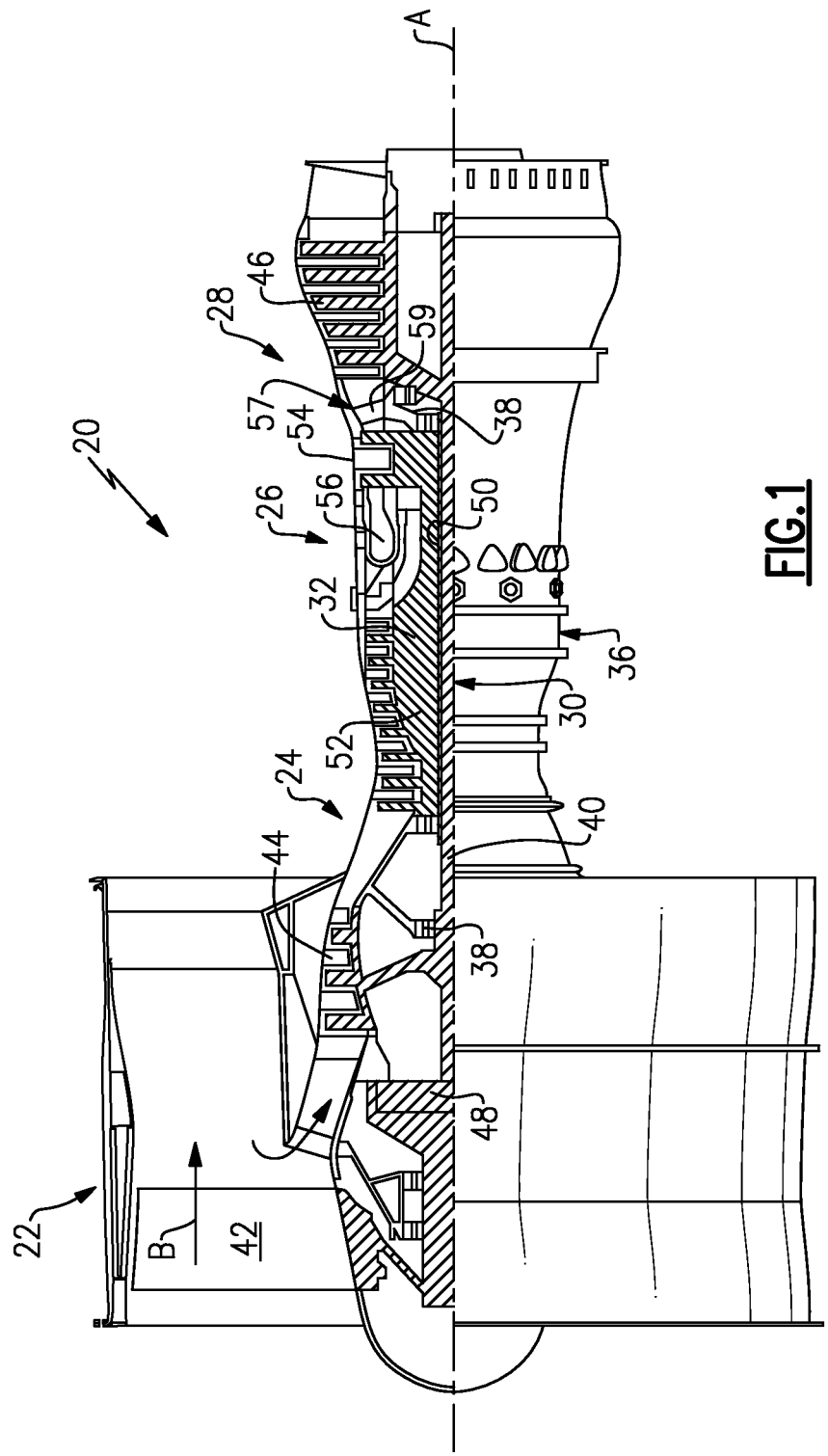
FIG. 1 is a cross-sectional view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include, for example, 3 spools, an augmentor section, or a different arrangement of sections, among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a gearbox 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example a high-bypass geared aircraft engine. In a further example, the engine 20 bypass ratio is greater than about six (6), with an example embodiment being greater than ten (10), the gearbox 48 is an epicyclic gear train, such as a planetary/star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The gearbox 48 may be an epicycle gear train, such as a planetary/star gear system or other gear system, with a gear reduction ratio of greater than about 2.5:1. It should be understood, however, that the above parameters are only exemplary of one embodiment of a gearbox in a gas turbine engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
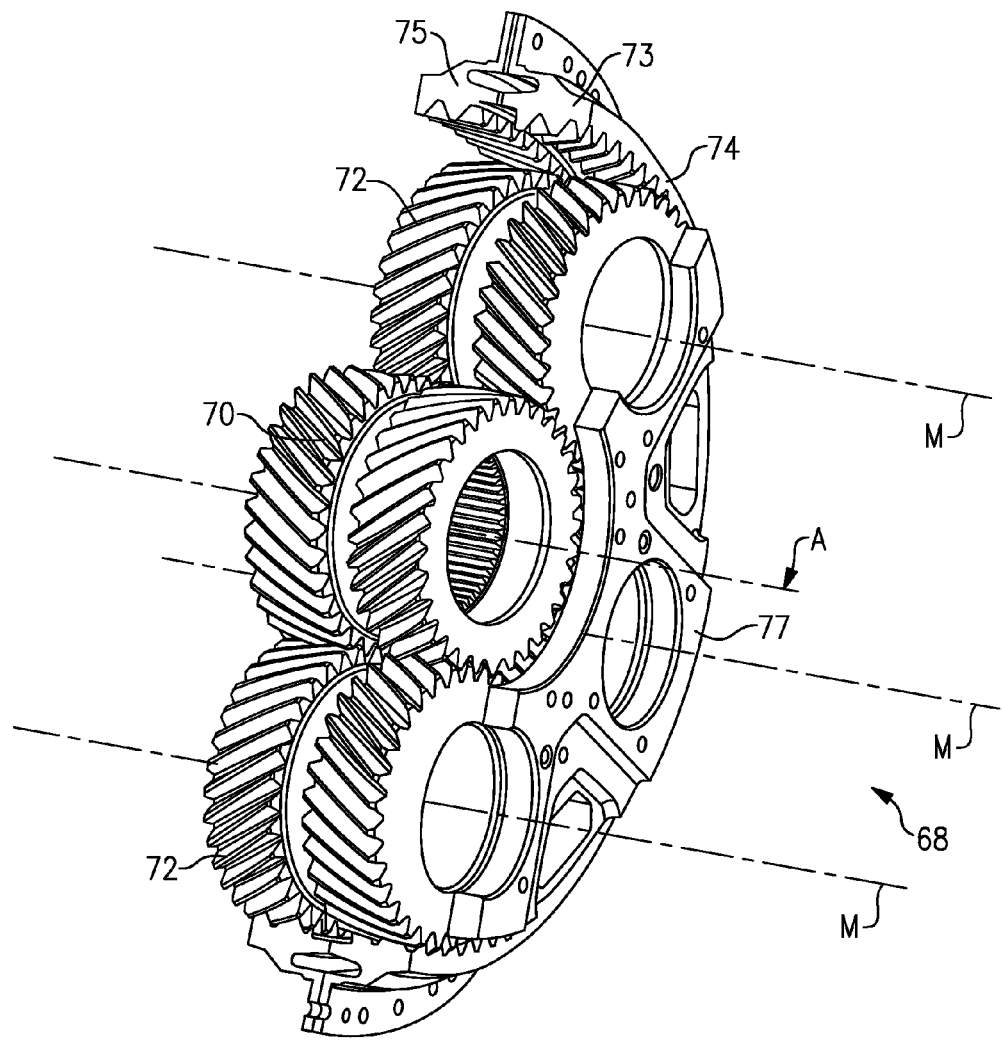
FIG. 2 is a perspective view of example gearbox.

FIG. 2 shows an example of the gearbox 48 as the epicyclical gear system 68 driven by the low speed spool 30. The epicyclical gear system 68 includes a sun gear 70, star gears 72, a ring gear 74, and a carrier 77. The sun gear 70 engages the star gears 72 and each star gear 72 engages the ring gear 74. In this example, each of the sun gear 70, star gears 72, and ring gear 74 are double helical gears, as will be described in further detail below.

Rotary motion of sun gear 70 urges each star gear 72 arranged about the sun gear 70 to rotate about their own respective axis M. The star gears 72 mesh with both the rotating ring gear 74 and rotating sun gear 70. The star gears 72 rotate about their respective axis M to drive the ring gear 74 to rotate about engine axis A. The rotation of the ring gear 74 drives the fan 42 (FIG. 1) at a lower speed than the low spool 30. The ring gear 74 is a split assembly and includes a first section 73 and a second section 75 that are urged together by the star gears 72.

In one example, the sun gear 70, star gears 72, and ring gear 74 have a transverse contact ratio greater than two (2) such that at least two gear teeth of each gear 70, 72, 74 engage at least two gear teeth of another gear 70, 72, 74 during operation.

The gearbox 48 is subject to variations in torque transfer due to geometry and manufacturing tolerances. These variations cause vibrations in the gearbox 48, which are imparted on other associated turbine engine components. The resultant vibration affects durability of gearbox 48 components, and associated turbine engine components, thus affecting the life of the gearbox 48 and gas turbine engine 20 components.

Figure 3:
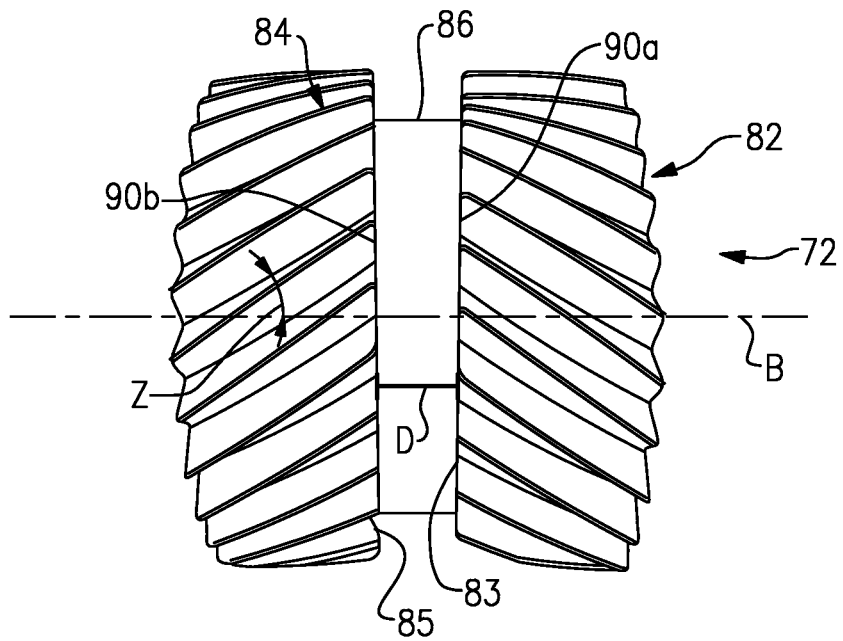
FIG. 3 is a perspective view of an example double helical gear.
Figure 4:
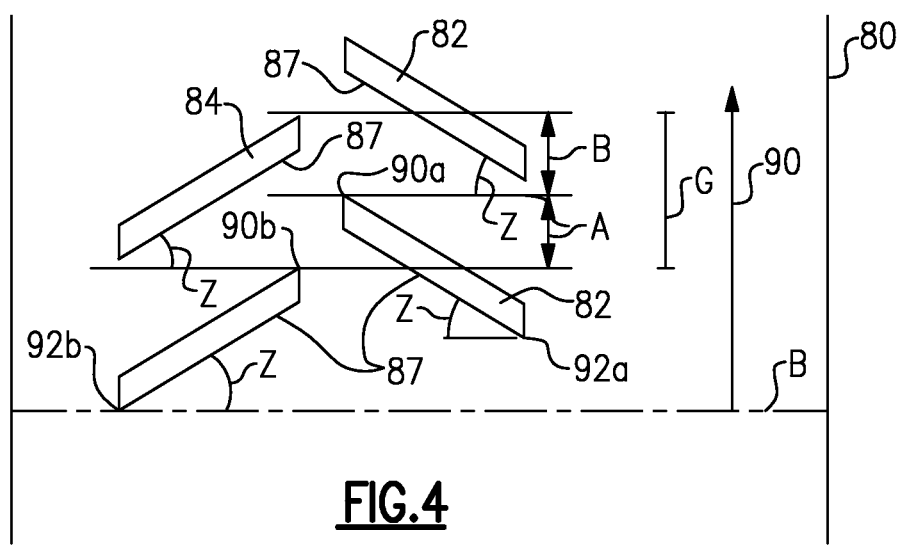
FIG. 4 is a top schematic view of teeth of the example double helical gear of FIG. 3.

FIGS. 3 and 4 shows an example of one of the star gears 72 as a double helical gear. It is to be understood that the described examples herein are also applicable to the sun gear 70, and ring gear 74, as well as other gears or gear systems of the gas turbine engine 20.

The star gear 72 includes a first plurality of gear teeth 82 disposed on a first base 83 opposite a second plurality of gear teeth 84 disposed on a second base 85 along axis B. The first plurality of gear teeth 82 and the second plurality of gear teeth 84 are separated by a non-toothed ring 86 disposed about axis B such that a first end 90a of the first plurality of gear teeth 82 and a first end 90b of the second plurality of gear teeth 84 are spaced apart an axial distance D equal to the width of the ring 86. The first plurality of gear teeth 82 and the second plurality of gear teeth 84 are rotatable around axis B.

In one example, the axial distance D of the width of non-toothed ring 86 is between 16% and 24% of the total axial length of the gear. In a further example, the first plurality of gear teeth 82 and the second plurality of gear teeth 84 each have an equal helix angle Z. In a further example, each of the first plurality of gear teeth 82 and the second plurality of gear teeth 84 have the same helix angle Z such that no axial thrust load is generated along axis B.

In another example, helix angle Z of the first plurality of gear teeth 82 is different than the helix angle Z of the second plurality of gear teeth 84, to generate a pre-determined thrust load along axis B in the gas turbine engine 20.

Each of the second plurality of gear teeth 84 includes the first end 90b and a second end 92b. Similarly, each of the first plurality of gear teeth includes the first end 90a and a second end 92a. In one example, the second plurality of gear teeth 84 is offset a circumferential offset distance A in relation to the next gear tooth 82 of the first plurality of gear teeth 82 when moving in circumferential direction of arrow 90. The first end 90a of each of the first plurality of gear teeth 82 is similarly spaced a circumferential offset distance B apart from the first end 90b of the next corresponding gear tooth 84 of the second plurality of gear teeth 84 when moving in direction of arrow 90. Circumferential offset distance G is a total of the circumferential offset distance A and the circumferential offset distance B between adjacent teeth of the second plurality of gear teeth 84 or first plurality of gear teeth 82.

Each of the first plurality of gear teeth 82 and second plurality of gear teeth 84 are arranged at the helix angle Z between axis B and a circumferential surface 87 each of the first plurality of gear teeth 82 and the second plurality of gear teeth 84. In this example, each of the first plurality of gear teeth 82 and the second plurality of gear teeth 84 are arranged at an equivalent helix angle Z relative to axis B.

In one example, the helix angle Z is between 30 and 35 degrees. In a further example, the helix angle Z is 33 degrees. The given helix angle Z or range urges the first section 73 and second section 75 of the ring gear 74 together.

The selected helix angle Z also influences the dynamics of the gearbox 48. As the helix angle Z increases from 0, a greater number of gear teeth 82, 84 engage teeth 82, 84 of a mating sun gear 70 and ring gear 74 (See FIG. 2). Selecting the first plurality of gear teeth 82 and second plurality of gear teeth 84 with the disclosed helix angle Z provides additional contact, and higher torque transfer, while maintaining the size of star gear 72.

Circumferential offset distance A and circumferential offset distance B are determined and used to offset each of the first plurality of gear teeth 82 from the next corresponding tooth 84 of the second plurality of gear teeth 84 between 0% and 100% of the circumferential offset distance G between each of the respective first plurality of gear teeth 82 or second plurality of gear teeth 84. In another example, the first plurality of gear teeth 82 are between about 25% to 75% offset from the second plurality of gear teeth 84 such that the ratio of circumferential offset distance A to circumferential offset distance G is between about 0.25 and 0.75. In a further example, the first plurality of gear teeth 82 are 50% offset from the second plurality of gear teeth 84, such that circumferential offset distance A and circumferential offset distance B are equal.

In another example, the circumferential offset distance A is selected in response to a gear characteristic of the star gear 72. The gear characteristic is at least one of harmonic level, transmission error, and vibration level through the star gear 72.

Figure 5A:
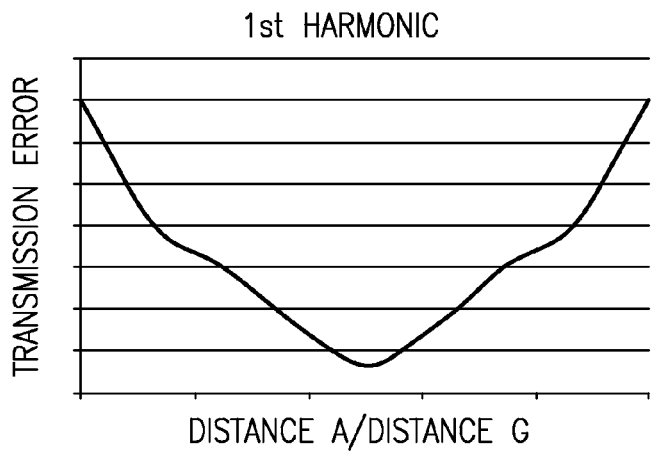
FIGS. 5A-5C are graphs illustrating example transmission error and gear teeth offsetting of the example double helical gear of FIG. 3.
Figure 5B:
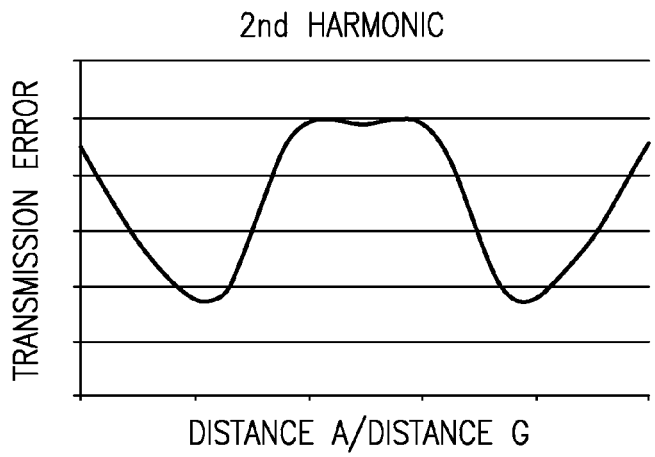
Figure 5C:
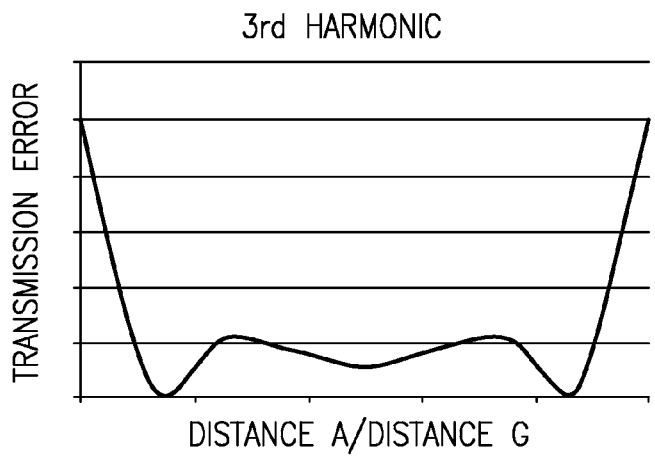

FIGS. 5A-5C show the circumferential offset distance A is pre-determined to provide a percent offset (axis X) in response to a frequency of the star gear 72 during meshing of star gears 72 in the gearbox 48. The percent offset results in a change in transmission error to effect the chosen frequency. Performance of the star gear 72 is controlled in response to the frequency based on the selected percent offset to reduce or minimize the amount of transmission error and vibration.

The frequency represents a harmonic level. In this example, a first harmonic has a frequency equal to the number of teeth on the sun gear times the revolutions per second of the sun gear relative to the carrier 77, a second harmonic has a frequency of 2 times the first harmonic, and a third harmonic has a frequency of 3 times the first harmonic. For each of the first harmonic, second harmonic, and third harmonic, transmission error is controlled by selecting a pre-determined percent offset between the first plurality of gear teeth 82 and second plurality of gear teeth 84, as equates to circumferential offset distance A and circumferential offset distance B. Transmission error is defined herein as the deviation between the circumferential position that the star gear 72 should have and the actual position during meshing.

In one example, as shown in FIG. 5A, the first plurality of gear teeth 82 are between about 25% to 75% offset from the second plurality of gear teeth 84 such that a ratio of circumferential offset distance A to circumferential offset distance G is between about 0.25 and 0.75 to reduce transmission error in the first harmonic.

In a further example, as shown in FIG. 5B, the first plurality of gear teeth 82 are between about 15% to 25% or 75% to 85% offset from the second plurality of gear teeth 84 such that a ratio of circumferential offset distance A to circumferential offset distance G is between about 0.15 and 0.25 or between about 0.75 and 0.85 to reduce transmission error in the second harmonic.

In a further example, as shown in FIG. 5C, the first plurality of gear teeth 82 are between about 15% to 85% offset from the second plurality of gear teeth 84 such that a ratio of circumferential offset distance A to circumferential offset distance G is between about 0.15 and 0.85 to reduce transmission error in the third harmonic.

In a further embodiment, the first plurality of gear teeth 82 are offset about 50% from the second plurality of gear teeth 84 such that a ratio of circumferential offset distance A to circumferential offset distance G is about 0.5 to reduce transmission error in the first harmonic and the third harmonic.

Offsetting the first plurality of gear teeth 82 and the second plurality of gear teeth 84 the circumferential offset distance A or circumferential offset distance B reduces the overall transmission error of the gearbox 48. Circumferential offset distance A and circumferential offset distance B are determined depending on the harmonic level(s) of the star gears 72 during meshing. Performance of the gearbox 48 is controlled by reduction in transmission error reduces vibration in the gearbox 48 and gas turbine engine 20 during operation. Thus, torque transfer is smoother, with less overall effect on engine component life and efficiency due to vibration.

Figure 6:
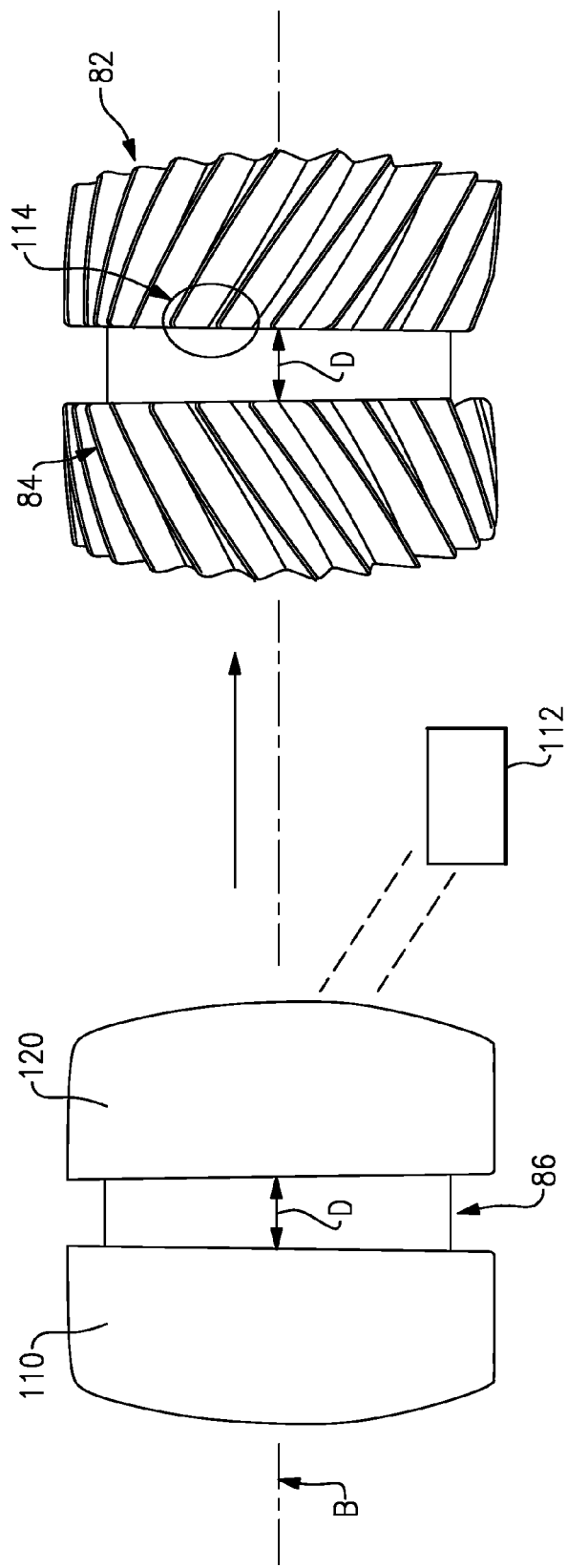
FIG. 6 is a perspective view of the steps of forming the example double helical gear of FIG. 3.

Referring to FIG. 6, an example method of forming the star gear 72 is shown. A first cylinder 110 and second cylinder 120 are arranged on either axial side of ring 86 along axis B. A tool 112 (shown schematically) is provided and machines grooves in the first cylinder 110 and the second cylinder 120 to form the first plurality of gear teeth 82 and second plurality of gear teeth 84. The first plurality of gear teeth 82 and second plurality of gear teeth 84 are arranged at an helix angle Z and offset an circumferential offset distance A and circumferential offset distance B, as described above. After one of the first plurality of gear teeth 82 and second plurality of gear teeth 84 are formed, the tool 112 is used to form the remaining plurality of gear teeth 82, 84 without affecting the dimensions of the already formed first plurality of gear teeth 82 or second plurality of gear teeth 84. The space between first cylinder 110 and second cylinder 120 provided by ring 86 allows the tool 112 to form the plurality of gear teeth 82, 84 without affecting the already formed plurality of gear teeth 82, 84. By offsetting the first plurality of gear teeth 82 and second plurality of gear teeth 84, the tool 112 is able to move into the space 114 between the already formed plurality of gear teeth 82, 84, thus reducing the width D of ring 86 needed to form the unformed plurality of gear teeth 82, 84. The reduction of width D decreases the weight of the star gear 72.

Although the example first cylinder 110 and second cylinder 120 are shown, it is within the contemplation of this disclosure to use other geometrical sections to form the star gear 72 based on gas turbine engine 20 specifications. In one example, the tool 112 is a grinding wheel.

Although a preferred embodiment has been disclosed, a worker of ordinary skill in this art would recognize that certain modifications would come within the scope of this disclosure. For that reason, the following claims should be studied to determine the true scope and content of this disclosure.

What is claimed is:

1. A turbine engine comprising:
   a fan;
   a compressor section;
   a combustor in fluid communication with the compressor section;
   a turbine section in fluid communication with the combustor; and
   a gearbox having a plurality of double helical gears in meshed engagement, each of the plurality of double helical gears disposed about an axis, each of the plurality of double helical gears having a first plurality of gear teeth axially spaced apart from a second plurality of gear teeth by a circumferential ring, wherein each of the first plurality of gear teeth has a first end facing the circumferential ring and each of the second plurality of gear teeth has a first end facing the circumferential ring, wherein each first end of the first plurality of gear teeth is circumferentially offset from each first end of the second plurality of gear teeth by a predetermined amount in response to a gear characteristic; and
   the gearbox including an epicyclic gear system.

2. The turbine engine of claim 1, wherein the plurality of double helical gears are a sun gear, plurality of star gears, and ring gear of the epicyclic gear system.

3. The turbine engine of claim 1, wherein the first plurality of gear teeth and the second plurality of gear teeth about each double helical gear are disposed at a helix angle relative to an axis.

4. The turbine engine of claim 3, wherein the helix angle corresponds to a contact ratio between a first of the plurality of double helical gears and a second of the plurality of double helical gears.

5. A turbine engine comprising:
   a fan;
   a compressor section;
   a combustor in fluid communication with the compressor section;
   a turbine section in fluid communication with the combustor;
   a gearbox having a plurality of double helical gears in meshed engagement, each of the plurality of double helical gears disposed about an axis, each of the plurality of double helical gears having a first plurality of gear teeth axially spaced apart from a second plurality of gear teeth by a circumferential ring, wherein each of the first plurality of gear teeth has a first end facing the circumferential ring and each of the second plurality of gear teeth has a first end facing the circumferential ring, wherein each first end of the first plurality of gear teeth is circumferentially offset from each first end of the second plurality of gear teeth by a predetermined amount in response to a gear characteristic;
   the first plurality of gear teeth and the second plurality of gear teeth about each double helical gear are disposed at a helix angle relative to an axis; and
   the helix angle being between about 30-35°.

6. The turbine engine of claim 5, wherein the helix angle is about 33°.

7. A gearbox for a gas turbine engine comprising:
   a plurality of double helical gears in meshed engagement, each of the plurality of double helical gears disposed about an axis, each of the plurality of double helical gears having a first plurality of gear teeth axially spaced apart from a second plurality of gear teeth by a circumferential ring, wherein each of the first plurality of gear teeth has a first end facing the circumferential ring and each of the second plurality of gear teeth has a first end facing the circumferential ring, wherein each first end of the first plurality of gear teeth is circumferentially offset from each first end of the second plurality of gear teeth by a predetermined amount in response to a gear characteristic;
   the gear characteristic is a harmonic level; and
   the first plurality of gear teeth being offset from the second plurality of gear teeth by the circumferential offset distance of about 15% to about 25% or about 75% to about 85% of a circumferential offset distance between each of the second plurality of teeth, wherein the harmonic level is the second harmonic level.

8. The gearbox of claim 7, wherein the harmonic level is one of the first harmonic level, a second harmonic level, and a third harmonic level.

9. The gearbox of claim 7, wherein the gear characteristic is transmission error.

10. A gearbox for a gas turbine engine comprising:
    a plurality of double helical gears in meshed engagement, each of the plurality of double helical gears disposed about an axis, each of the plurality of double helical gears having a first plurality of gear teeth axially spaced apart from a second plurality of gear teeth by a circumferential ring, wherein each of the first plurality of gear teeth has a first end facing the circumferential ring and each of the second plurality of gear teeth has a first end facing the circumferential ring, wherein each first end of the first plurality of gear teeth is circumferentially offset from each first end of the second plurality of gear teeth by a predetermined amount in response to a gear characteristic;
    the gear characteristic being a harmonic level; and
    the first plurality of gear teeth being offset from the second plurality of gear teeth by the circumferential offset distance of about 25% to 75% of a circumferential offset distance between each of the second plurality of gear teeth.

11. A gearbox for a gas turbine engine comprising:
    a plurality of double helical gears in meshed engagement, each of the plurality of double helical gears disposed about an axis, each of the plurality of double helical gears having a first plurality of gear teeth axially spaced apart from a second plurality of gear teeth by a circumferential ring, wherein each of the first plurality of gear teeth has a first end facing the circumferential ring and each of the second plurality of gear teeth has a first end facing the circumferential ring, wherein each first end of the first plurality of gear teeth is circumferentially offset from each first end of the second plurality of gear teeth by a predetermined amount in response to a gear characteristic: and
a helix angle between the axis and each of the first plurality of gear teeth and second plurality of gear teeth being between 30° and 35°.

12. The gearbox of claim 11 wherein the helix angle between the axis and each of the first plurality of gear teeth and second plurality of gear teeth is 33°.

13. A gearbox for a gas turbine engine comprising:
a plurality of double helical gears in meshed engagement of the plurality of double helical gears disposed about an axis, each of the plurality of double helical gears having a first plurality of gear teeth axially spaced apart from a second plurality of gear teeth by a circumferential ring, wherein each of the first plurality of gear teeth has a first end facing the circumferential ring and each of the second plurality of gear teeth has a first end facing the circumferential ring, wherein each first end of the first plurality of gear teeth is circumferentially offset from each first end of the second plurality of gear teeth by a predetermined amount in response to a gear characteristic;
the gear characteristic is a harmonic level;
the harmonic level is one of the first harmonic level, a second harmonic level, and a third harmonic level; and
the first plurality of gear teeth being circumferentially offset about 50% from the second plurality of gear teeth to reduce a transmission error in the first harmonic and the third harmonic.

\* \* \* \* \*

UNITED STATES PATENT AND TRADEMARK OFFICE
CERTIFICATE OF CORRECTION

| | | |
|---|---|---|
| PATENT NO. | : 8,720,306 B2 | Page 1 of 1 |
| APPLICATION NO. | : 13/438245 | |
| DATED | : May 13, 2014 | |
| INVENTOR(S) | : McCune et al. | |

It is certified that error appears in the above-identified patent and that said Letters Patent is hereby corrected as shown below:

IN THE CLAIMS:

On claim 13, column 9, line 11: insert --, each-- after "engagement"

Signed and Sealed this
Eighth Day of July, 2014

Michelle K. Lee
*Deputy Director of the United States Patent and Trademark Office*